United States Patent [19]

Stiel

[11] 4,121,289

[45] Oct. 17, 1978

[54] METHOD INVOKING TABLETTING COMPRESSION FORCE CONTROL FOR OPTIMIZING TABLETTED FORMULATION PARAMETERS

[75] Inventor: Donald Melvyn Stiel, Pine Brook, N.J.

[73] Assignee: Hoffmann-La Roche Inc., Nutley, N.J.

[21] Appl. No.: 750,490

[22] Filed: Dec. 14, 1976

Related U.S. Application Data

[63] Continuation of Ser. No. 581,459, May 28, 1975, abandoned.

[51] Int. Cl.[2] .............................................. G06F 15/46

[52] U.S. Cl. ................................... 364/552; 264/40.1; 364/476

[58] Field of Search ............. 235/151.13, 151.3, 151.1, 235/151, 151.12; 264/40, 40.1, 40.4, 40.5, 40.6, 109, DIG. 37; 209/79; 425/147, 149, 256, 261, 246, 176, 347, 352, 354, 135, 139, 162; 73/88.5 R; 364/100, 118, 476, 552, 105

[56] References Cited

U.S. PATENT DOCUMENTS

| | | | |
|---|---|---|---|
| 3,255,716 | 6/1966 | Knoechel et al. | 264/40.4 |
| 3,734,663 | 5/1973 | Holm | 425/147 |
| 3,982,865 | 9/1976 | Adams et al. | 425/149 |

FOREIGN PATENT DOCUMENTS

| | | | |
|---|---|---|---|
| 1,216,397 | 12/1970 | United Kingdom | 264/40.4 |

OTHER PUBLICATIONS

Knoechel et al. "Instrumented Rotary Tablet Machines I-Design, Construction and Performance as Pharmaceutical Research and Development Tools," J. Pharm. Sc., vol. 56, No. 1, pp. 109-115, Jan. 1967.

Edward Mendell Co., Inc., Yonkers, N.Y. "Advanced Techniques in the Art of Direct Compression".

*Primary Examiner*—Joseph F. Ruggiero

*Attorney, Agent, or Firm*—Samuel L. Welt; Bernard S. Leon; Mark L. Hopkins

[57] ABSTRACT

There is disclosed a method for standardizing, in terms of a pre-established range of acceptable in vitro release and/or in vivo response, production of tabletted formulations which have a dependency on tablet hardness, through control of the maximum tabletting compression force developed by the tablet press employed, and for providing an individual momentary as well as permanent readout in digital form of the maximum compression force developed for each tabletting event. One or more tablets are compressed from a particular batch of formulation at selected different press compression force settings. These tablets are processed to derive data regarding in vitro release and/or in vivo response with a determination of an optimum value being made directly from or by interpolation of the resulting data. This optimum value is correlated to a press setting and the press is then set thereat for the tabletting of the bulk of the batch of formulation. Transducer means appropriately mounted on the press effect a signal output representative of the compression force developed for each tabletting event. The transducer output is processed to derive only the true maximum developed compression force for each tabletting event. The derived force is then displayed and recorded in digital form.

1 Claim, 16 Drawing Figures

METHOD INVOKING TABLETTING COMPRESSION FORCE CONTROL FOR OPTIMIZING TABLETTED FORMULATION PARAMETERS

This is a continuation of application Ser. No. 581,459 filed May 28, 1975, now abandoned.

BACKGROUND OF THE INVENTION

The present invention relates to controlling tablet formation and more particularly to measuring, displaying and recording the maximum compression force developed by a tablet press during tabletting (i.e. tablet formation) and utilizing this information to optimize tablet formation. The invention has particular, but by no means thusly limited, application to the tabletting of so-called sustained-release type formulations. As mentioned herein, maximum compression force constitutes the highest or peak force actually developed in a routine tabletting event.

It may be taken as known that many tabletted formulations, particularly the sustained-release dosage forms, have a dependency on hardness, regarding, for example, in vivo rate of release. It may be also taken as known that in many tabletted formulations, tablet hardness is inversely proportional to dissolution rate, disintegration rate or rate of release, i.e. harder compressed tablets have a slower dissolution rate, disintegration rate or rate of release (hereinafter generally referred to as rate of release or release rate). It has, moreover, been determined that in certain instances there is a direct relationship between in vitro release and in vivo release.

It has been determined, that indeed, the compression force forming the tablets is linearly related to tablet hardness, and thus related to release rate, i.e. the greater the compression force used in forming a tablet, the harder that tablet will be and the slower will be the rate of release thereof, and thus in certain instances the slower the in vivo response.

It would be, therefore, highly desirable to accurately control tabletting whereby the rate of release may predictably be established within well-defined desired limits for a particular formulation, through controlling the hardness of the tablets. It is, thus, in turn, desirable that means be provided to control the compression force during tabletting, which is, as aforesaid, linearly related to hardness, and utilize said means in connection with a determination as to what compression limits correlate to the most desirable tablet response. It is, moreover, desirable to reduce the number of trials needed to establish parameter limits, as well as to ensure that the hardness chosen would not materially affect the ejection of the tablets from the press dies, and will not cause "capping" or "lamination" of the tablets.

The prior art in this field is directed to the use of tablet hardness testers to provide hardness information used for correlation to release rate. However, hardness testers can only test a limited number of tablets out of an entire batch. Moreover, they provide a particularly slow test, requiring, for example, in the area of 15 seconds per tablet. Most importantly, too, hardness testers provide a destructive test. Additionally, the hardness testers of the prior art are generally not sufficiently accurate; variations in hardness are not always detectable at the required sensitivity level. This is particularly true with regard to those hardness testers which measure the force required to crush a tablet (i.e. "crush" strength) as opposed, for example, to those which measure the force required to break a tablet which is supported as a simple beam (i.e. tensile or "snap" strength), the latter having empirically been found to provide a higher measure of correlative accuracy to, for example, in vivo response. A reason for this appears to derive from the determination that as the tablets get harder, the crush strength does not appear to increase beyond a certain point, whereas the tensile strength does continue to increase, with a corresponding decrease in the rate of drug release. Although tensile or snap strength hardnes testing has been shown to improve accuracy, greater accuracy is desirable and in many instances needed.

Aside from the aforementioned limitations, there are highly desirable features potentially having substantial commercial impact which are found wanting in the prior art. It would be desirable for example, to provide for instantaneous determination of maximum compression force (and therefrom hardness) for each tablet, particularly at the time of formation. It would, moreover, be highly desirable to derive a maximum compression force signal for each tabletting event free of false maximum compression force peaks. It is, of course, highly beneficial and desirable to achieve the goals herein contemplated: through non-destructive testing means; via a much faster test than that of the prior art, such as for example the hardness testers; and with an accuracy exceeding that available in the prior art. Furthermore, it is necessary for purposes of accuracy to provide that the system arrangement will not respond to false maximum compression force peaks and non-compression force peaks in the force signal (voltage) readings.

SUMMARY OF THE INVENTION

It is, therefore, a principal objective of this invention to provide a method for overcoming the aforementioned disadvantages of the prior art and to meet the aforementioned criteria desirable in this field.

It is another object of this invention to provide a method for controlling the hardness of tablets in manufacturing.

It is a further object of this invention to derive a more uniform and superior tabletted product using tablet maximum (peak) compression force information (in its relationship with tablet hardness) as a means of control of certain physio-chemical parameters of a tabletted formulation such as rate of release.

It is a further object of this invention to provide measurement and digital display and permanent recordation of the maximum force developed by a tablet press during compression of each tablet.

It is yet another object to determine optimum hardness of tablets of a particular formulation and for non-destructively ensuring that an entire batch of tabletted formulation is compressed at that optimum hardness.

It is a further object to provide a method in which preliminary compressions of a particular formulation at various tablet hardnesses are undertaken to determine which hardness infers optimum response, with the tabletting of the bulk of that batch of formulation then being effected at that optimum hardness and controlled thereby.

It is another object to provide elimination of the effects of small amplitude perturbations present in the derived compression force signal which constitute false maximum peaks for a particular compression event.

It is still a further object to provide maximum compression force signals free of spurious electronic noise which might cause erroneous indication of peak developed tablet compression force.

The invention relates to the fact that in general tablet hardness is linearly proportional to maximum (peak) compression force within normal tablet hardness ranges for a given formulation, and as such, maximum compression force is usable to infer hardness and, in turn, rate of release for that formulation without destructively testing the product. As tablet compression force measurements, then, may be employed to replace hardness testing for correlation to optimum rate of release, production procedures are simplified and accelerated. Since there exists with many tabletted formulations correlation between hardness and in vitro release, use of the most correct hardness throughout the tabletting of an entire batch of a particular formulation, as determined by preliminary compression studies involving compression force and in vitro release data, will ensure that each tablet formed will provide the response desired; tablet hardness, then is readily maintainable over the compression of an entire batch by monitoring the maximum developed compression force signal.

According to the broader aspects of the invention, therefore, there is provided a method for standardizing within pre-established limits a physio-chemical parameter of a batch of formulation in tabletted form which parameter has a dependency on tablet hardness, comprising: precompressing on a tablet press at least one tablet of the formulation at each of a plurality of different selected maximum developed tabletting compression forces; processing at least one tablet tabletted at each of the different maximum developed compression forces to derive respectively information regarding the physio-chemical parameter for each tablet processed; determining (e.g. by selection or interpolation) from the derived information an optimum for the physio-chemical parameter and correlating this optimum value to a maximum developed tabletting compression force; and setting the tablet press at the correlated optimum maximum developed compression force and compressing the remainder of the batch of the formulation at that setting of the tablet press.

Among the numerous notable features of the within invention is the aspect that every tablet made can be determined to fall within desired hardness and rate of release criteria from signals representing the maximum force used in forming that tablet. The invention provides, moreover, for direct display and recording digitally of the maximum developed compression force for each tablet formed, as derived from the strain or force detected in association with the press compression element(s). The invention is readily adaptable for use, for example, in connection with practically any single die type tablet press, as provided with an appropriate force transducer.

Additional features are provided which include preventing system responses to false maximum compression force readings, i.e. a capability of rejecting all but the true maximum developed compression force reading for each tabletting event. All peaks are sensed and there is rejected all but the highest peak developed. Each lower peak encountered is effectively rejected the moment a higher peak is detected in each tabletting event.

The invention, also enables one to check whether the press overload system is correctly set, i.e. not set below the maximum compression force developed.

A force detection means, such as a piezo-electric force transducer, is installed in association with a portion of the tablet press experiencing an accurate indication of the compression of particulate material into tablets. Compression forces developed during tablet formation are sensed by the transducer, with the output voltage thereof being processed by an electronic signal processing unit. The electronic signal processing unit provides a display of the maximum compression force for each tablet produced and records each measurement with a digital printer. Provision is made for the permanent recordation of the signal information from the detecting means on other recording means such as an oscillograph or a strip chart recorder. Such information is initially correlated to tablet hardness and rate of release information to effect a determination of optimum maximum developed compression force for a particular formulation.

The principle stages of the processing electronics include appropriate input signal filtering, peak detection means for locating the maximum voltage from each pulse (correlating to maximum compression for each tablet) and digital panel meter and printer means. Scaling control means for obtaining the final reading in desired units such as pounds or kilograms and an electronic calibration arrangement are also provided.

BRIEF DESCRIPTION OF THE DRAWINGS

The above-mentioned and other objects and features of this invention will become more apparent and the invention itself will be better understood by reference to the following description taken in conjunction with the accompanying drawings, in which.

DESCRIPTION OF THE PREFERRED EMBODIMENT(S)

The invention was developed in light of the fact that characteristics of certain tabletted formulations have a dependency on tablet hardness, i.e for example, harder compressed tablets have slower rates of release. It was necessary in order to deal effectively with this phenomenon to develop a control of the hardness of tablets in manufacturing. For reasons hereinbefore indicated, hardness testers, even those which measure tensile or snap strength, have certain characteristics unattractive for production control. It remained for the present invention to provide the capability of nondestructively controlled tablet hardness in relation to desired tablet response, and to do so reliably and accurately in a production situation.

As a result of the invention, one is able to make preliminary compressions of a few tablets at various tablet hardnesses by controllably varying the press maximum developed compression force employed in tabletting. From these preliminary compressions one may determine for the particular batch of particulate material from which the preliminary runs are made, which hardness, i.e. which maximum developed compression force, is most correct for the desired response. Then, the bulk of the batch may be compressed out at that optimum hardness. As part of this manufacturing control procedure, the invention is thus useful in ensuring that the entire batch is compressed at that hardness.

Figure 1A:
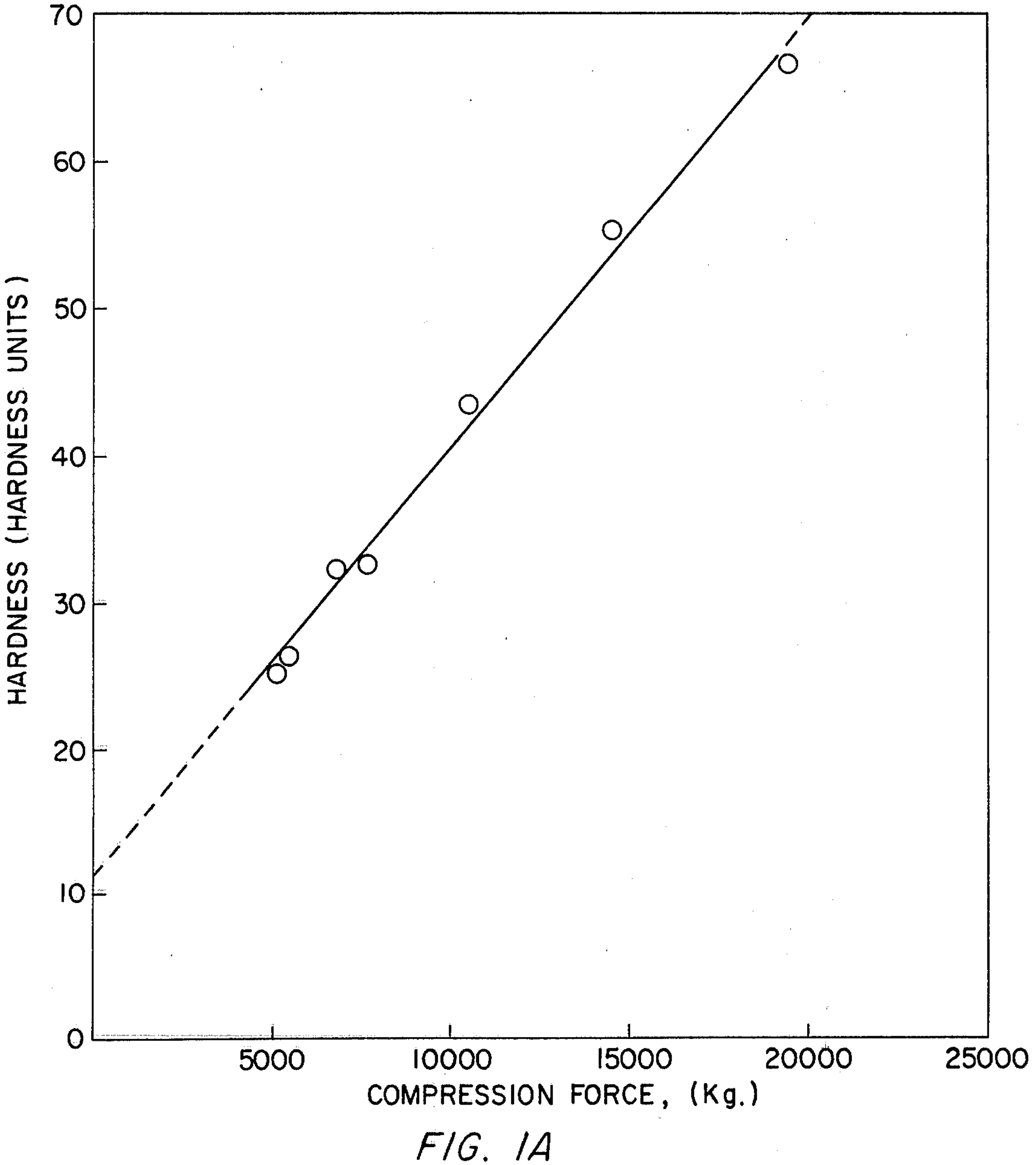
FIG. 1A, is a graphic illustration showing the generally linear relationship between maximum developed compression force and tablet hardness.

The invention provides measurement and digital display of the peak compression force developed for each tablet, which as aforesaid, has been determined to be generally linearly related to tablet hardness, as is indicated in graphic illustration in FIG. 1A. Hardness in hardness units is indicated along the ordinate axis and maximum developed compression force in kilograms as indicated along the absissa. The particular formulation tested and plotted therein was tabletted on a Stokes Model R tablet press. As shown, the actual calibrated force settings for the various trial runs vary from approximately 5,000 kilograms to 20,000 kilograms. The hardness of the tablets thus formed was determined via a tensile strength type hardness tester.

Figure 1B:
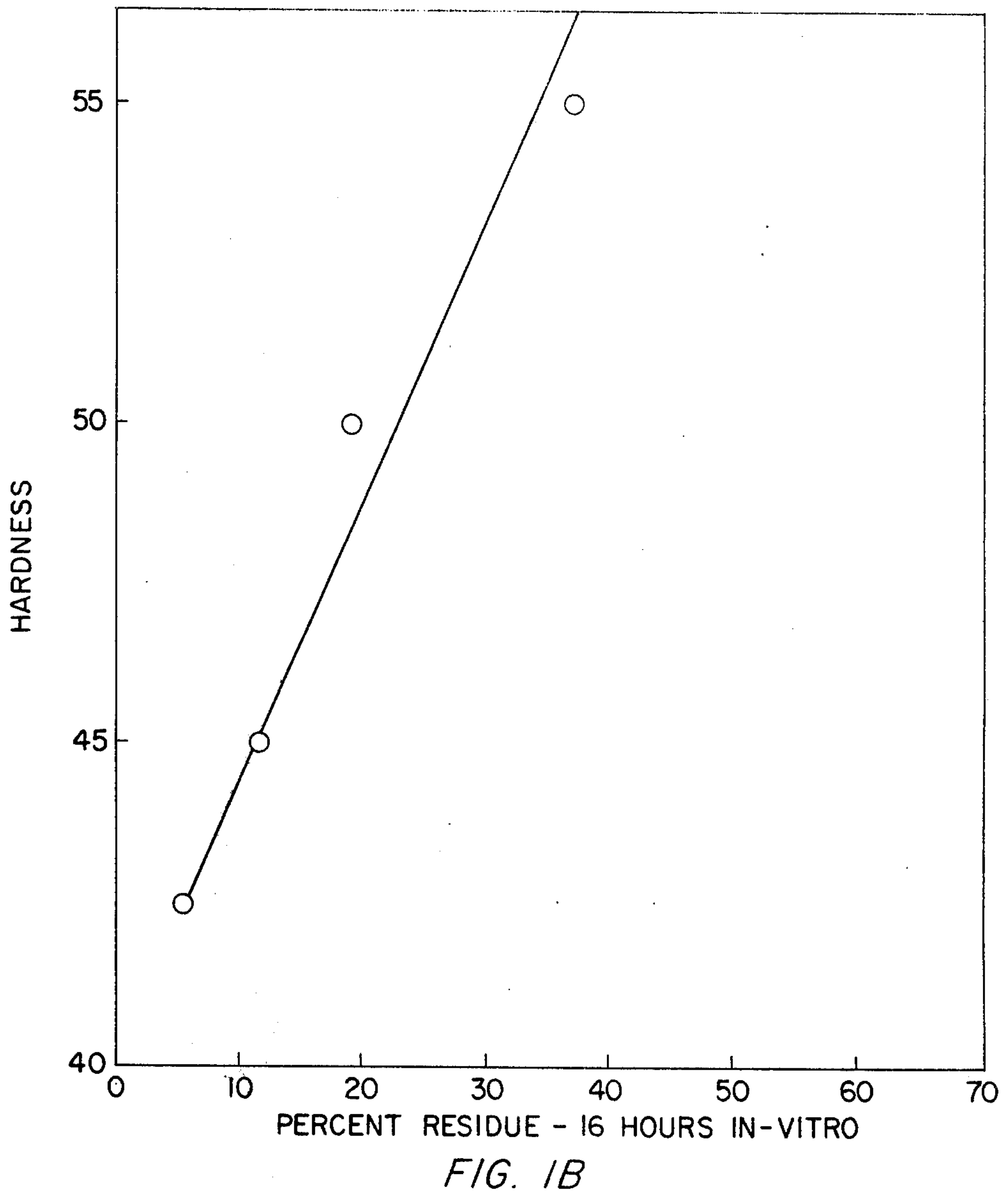
FIG. 1B, graphically illustrates the generally linear but inverse relationship between tablet hardness and in vitro release for a particular formulation.
Figure 1C:
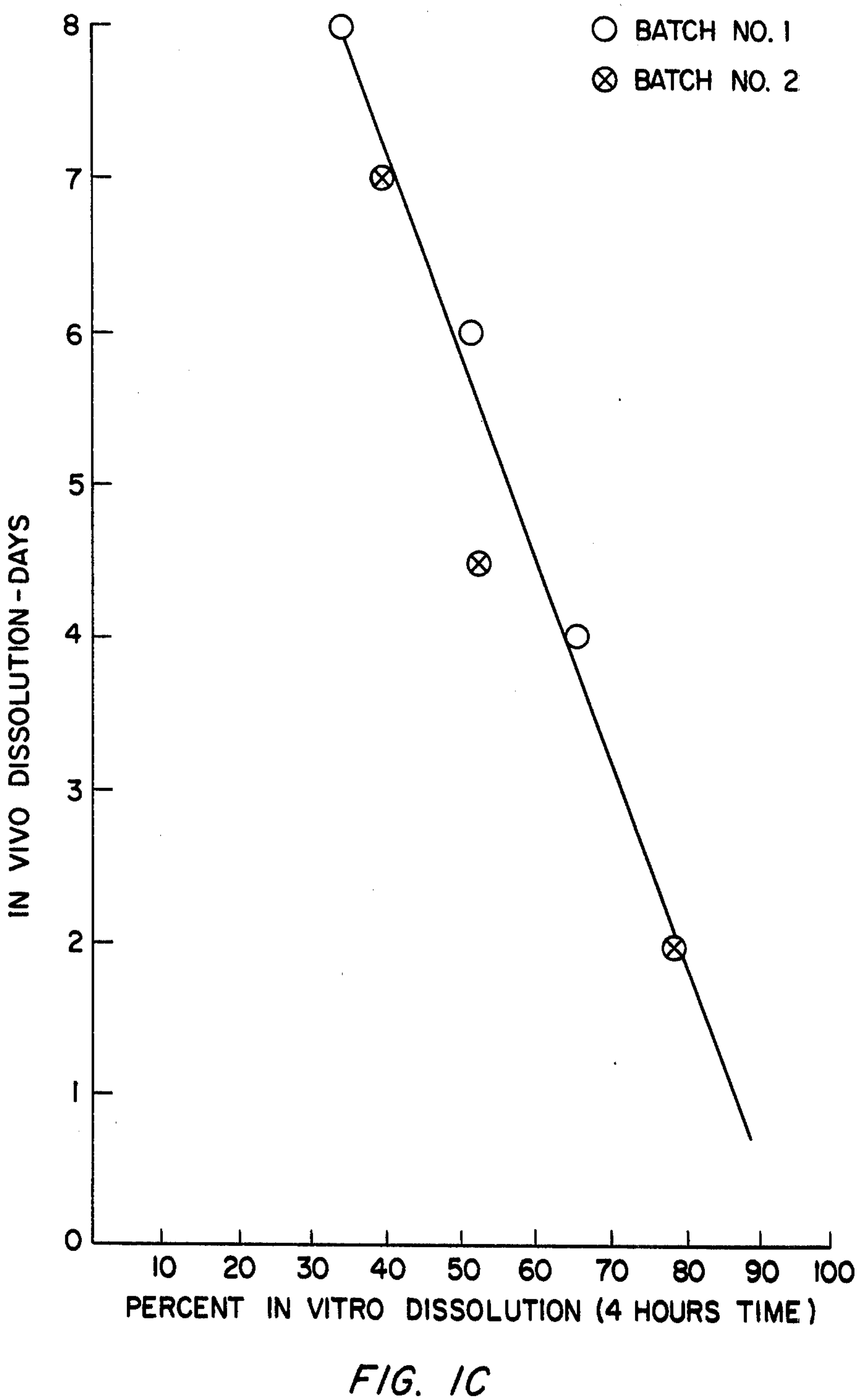
FIG. 1C is a graphic illustration of the relationship between in vitro release (percent dissolution) and in vivo response (dissolution) for the formulation.

In relation thereto, FIG. 1B graphically illustrates the generally linear but inverse relationship between tablet hardness (in hardness units) and in vitro release (percent residue) for the example of formulation under consideration. FIG. 1C illustrates graphically, in turn, the generally linear relationship between in vitro release (percent dissolution) and in vivo response (dissolution) obtained.

The principles of production tabletting of a particular formulation, then may begin with a precompression trial run in which a relatively very small number of tablets are prepared at different hardnesses, i.e. at different maximum (peak) compression force press settings. One or more of the tablets produced in each force setting may be tested on a tensile strength type hardness tester to derive the corresponding hardness values in hardness units. The remaining precompressed tablet samples are processed for the in vitro release rates and therefrom the optimum tabletting compression force selected. The entire production batch may then be tabletted at that selected force (hardness). The technology of varying compression force/hardness serves inter alia to compensate for batch-to-batch variability of granulation of a particular formulation in order to yield a final product that is consistently uniform within a practical and pre-established range.

Of course, the above procedure is readily simplified by recording the various forces employed in tabletting the "pre-compressed" samples, and relating same to desired results of in vitro testing. This is possible, as aforesaid, in view of the relationship between maximum developed compression force and in vitro rate of release for particular formulations. Such a procedure obviates the need for the hardness testing altogether. The range of compression forces employed in the precompressed tablets stage should be sufficiently wide to easily cover the area of optimum rate of release specifications. With the results of the in vitro testing indicating a "most" acceptable release rate, the entire batch of formulation would then be compressed at that specific correlated hardness (i.e. peak compression force) showing the most acceptable release rate or as suggested by interpolation of the precompression testing data. Of course, the hardness of the tablets (actually the compression force employed in tabletting of the production run) could and should be checked at routine intervals to see that the selected value is maintained throughout the entire tabletting process. In this regard the invention provides means for detecting and recording the maximum developed compression force for each tabletting event.

Figure 2:
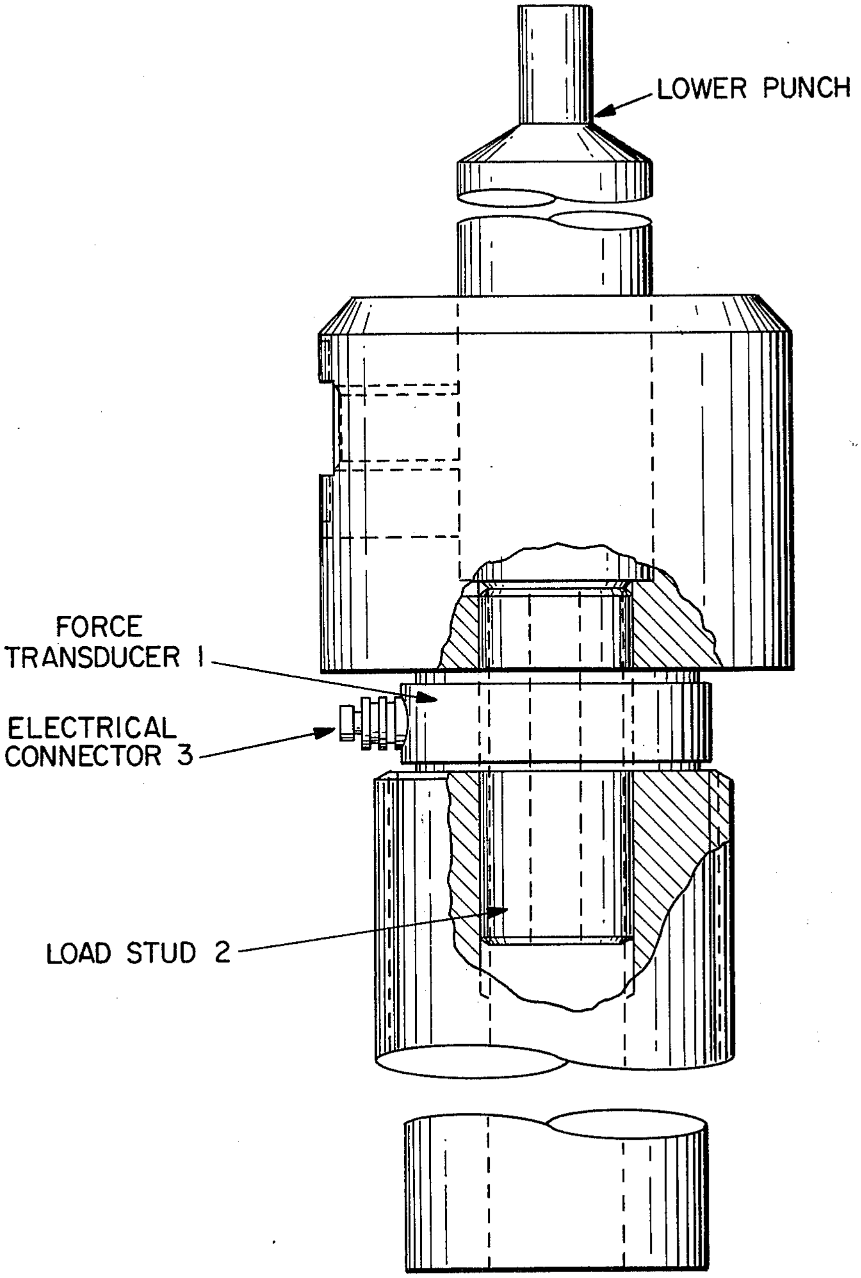
FIG. 2 illustrates in diagrammatic form a portion of a tablet press (in this example the lower punch and lower punch holder of a single punch press) experiencing the compression force generated during tabletting, with a force transducer mounted therewith.

The system for performing measurement of the maximum force developed by a tablet press during compression of each item comprises an element such as a piezoelectric force transducer located on an element of the tablet press experiencing the tabletting compression force(s). Reference is made to FIG. 2, in which there is illustrated therein a piezo-electric load washer (force transducer) arrangement 1 mounted in connection with for example the lower plunger 2 of the press, such as a Stokes Model R tablet press. Transducer 1 is provided with an electrical connector 3 to tap off the developed voltage. Only so much of the press is shown in FIG. 2 for simplicity of understanding of the invention. The force transducer 1 may be any suitable commercially available unit such as for example Model 206A/482M08 force transducer of Piezotronics Inc., Buffalo, N.Y. Force transducer 1 in the example case detects the compression force experienced in the lower plunger or punch of the press and provides a voltage signal output characteristic of the force experienced on the plunger in a well-known manner. The varying voltage signal output of the force transducer 1 is representative of the force on the press plunger throughout each entire tabletting cycle, including the peak or maximum compression level developed.

Figure 3A:
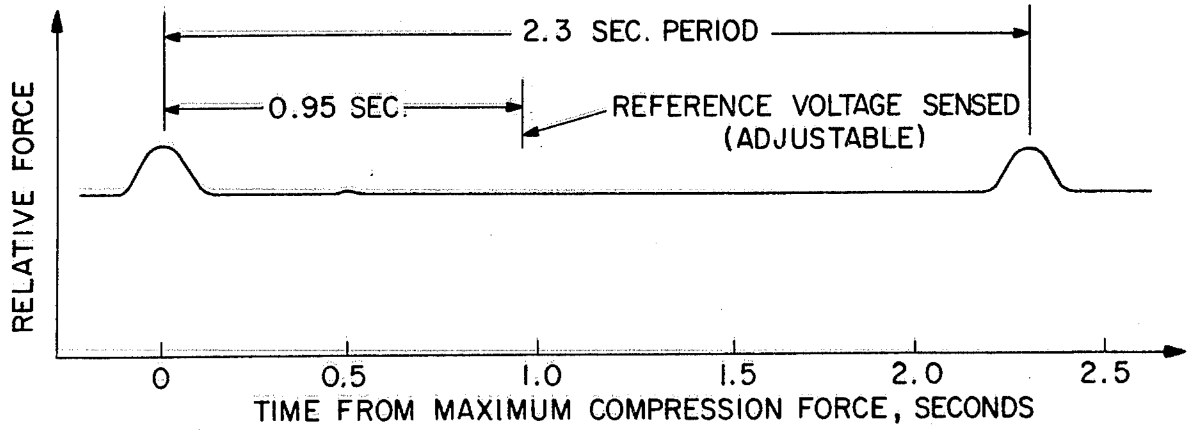
FIG. 3A, graphically illustrates in a force versus time curve the voltage signal output of the force transducer covering a complete tabletting event.

FIG. 3A, graphically illustrates in a force versus time curve, a typical example of the voltage signal output of transducer 1, in which a complete tabletting event or cycle is detected. It will be appreciated that FIG. 3A is representative of the transducer output somewhat optimally presented, i.e. free of noise as well as irregularities in the developed force. Irregularities in the developed force may, for example, be experienced with the press overload setting being lower than the desired maximum developed compression force. It has been determined, though, that the voltage signal representative of compression force is generally not burdened with substantial high frequency components.

This voltage signal reading is coupled to the electronic signal processing and recording unit which inter alia converts the signal to a digital display readout and digital recording as to each tabletting event. The signal processing unit is illustrated in block diagram form in FIG. 4. The transducer output signal is introduced to the unit at 10 and is coupled to a low pass filter 11 which may be of the Butterworth type. The input signal may also be connected to an external signal processor via lead 12*a* to enable the recording and for processing of the signal for some different or additional purpose. Thus, more than one processing unit may be used with the same transducer. The input at 10 additionally is shown to be coupled to a switch-controlled calibration signal source 13.

Figure 3B:
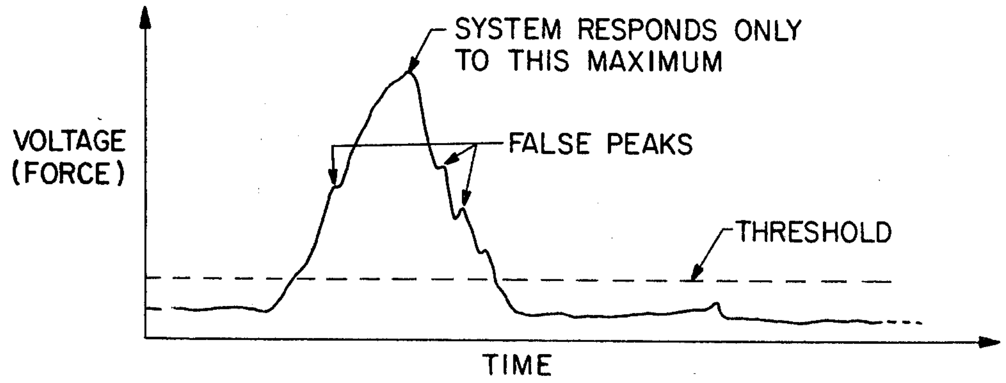
FIG. 3B illustrates graphically a portion of the force versus time curve of the voltage signal output of the force transducer somewhat accentuated to show small amplitude perturbations representing false maximum developed force peaks.

Low pass filter 11 is designed to provide high attenuation of for example high frequency, spurious electronic noise which may penetrate the input signal line, which could otherwise cause an erroneous indication of maximum developed compression force. A preferred filter here would be, for example, a 50 Hz low pass filter. Moreover, small amplitude perturbations have been observed on the main signal, as represented for example by the trace diagram of FIG. 3B, which may cause improper operation of an electronic peak detector status circuit, simply because these perturbations present several "apparent" peaks (zones where the slope of the curve is zero and the second derivative is negative) during the compression stroke. It has been determined that the frequencies of these perturbations generally fall in the range of 50 – 100 Hz. The use of low pass filter 11 with a cutoff frequency of approximately 50 Hz is, therefore, largely effective to eliminate this potential problem area.

The output of low pass filter 11 is fed to a peak detector stage 14 which is designed to locate the maximum (true peak) voltage from each compression stroke pulse relating to each tabletting cycle and provide a pair of outputs, i.e. a digital output at 15 as well as an analog output at 16. The digital or logic output at 15 is coupled to monostable multi-vibrator (one shot) circuitry 17 which, after a pre-established time delay, generates a read command, i.e. an enable pulse, to a digital panel meter arrangement 18. The analog output at 16 if fed through a scale control circuit 19 which is used to control the panel meter arrangement 18.

The output of filter 11 is shown to be also coupled to an analog display device 22 such as a strip chart recorder, oscillograph or similar device. Additionally, the filter 11 output may be fed via lead **12*b* to external means where additional or external processing may be effected, or a comparison made with the signal appearing at 12*a***.

One purpose of having the tap points before and after the filter stage 11 is to provide an operator with the option of comparative monitoring of the tapped-off signals, i.e. to be able to observe the signal before and after processing by the low pass filter 11, for instance via an oscillograph. In this way, the operator may verify that filter 11 is not filtering out wanted information. By visual comparison of the upstream and downstream waveforms it may be easily determined that the filter 11 is operating properly, i.e. removing the noise and high frequency false maximum peaks. One may also make a comparison say of the upstream waveform present at **12*a*** with a standard or reference waveform to ensure that the press overload setting is proper, i.e. set higher than the peak compression force at which it is intended the press will be set for carrying out the purposes of this invention. Also, by said comparison an operator may verify that the entire tabletting cycle is normal relative to the standard or reference waveform.

Coupled to the digital panel meter 18, which may, for example, be an Electro-Numerics Series 3400, is a digital printer 21 such as Beckman Instruments Model 1454.

The element 18 essentially provides an analog-to-digital conversion and includes means for displaying the digital output, i.e. the A/D output. Element 18 provides a BCD output suitable for connection to a digital printer such as the unit 21.

Figure 4:
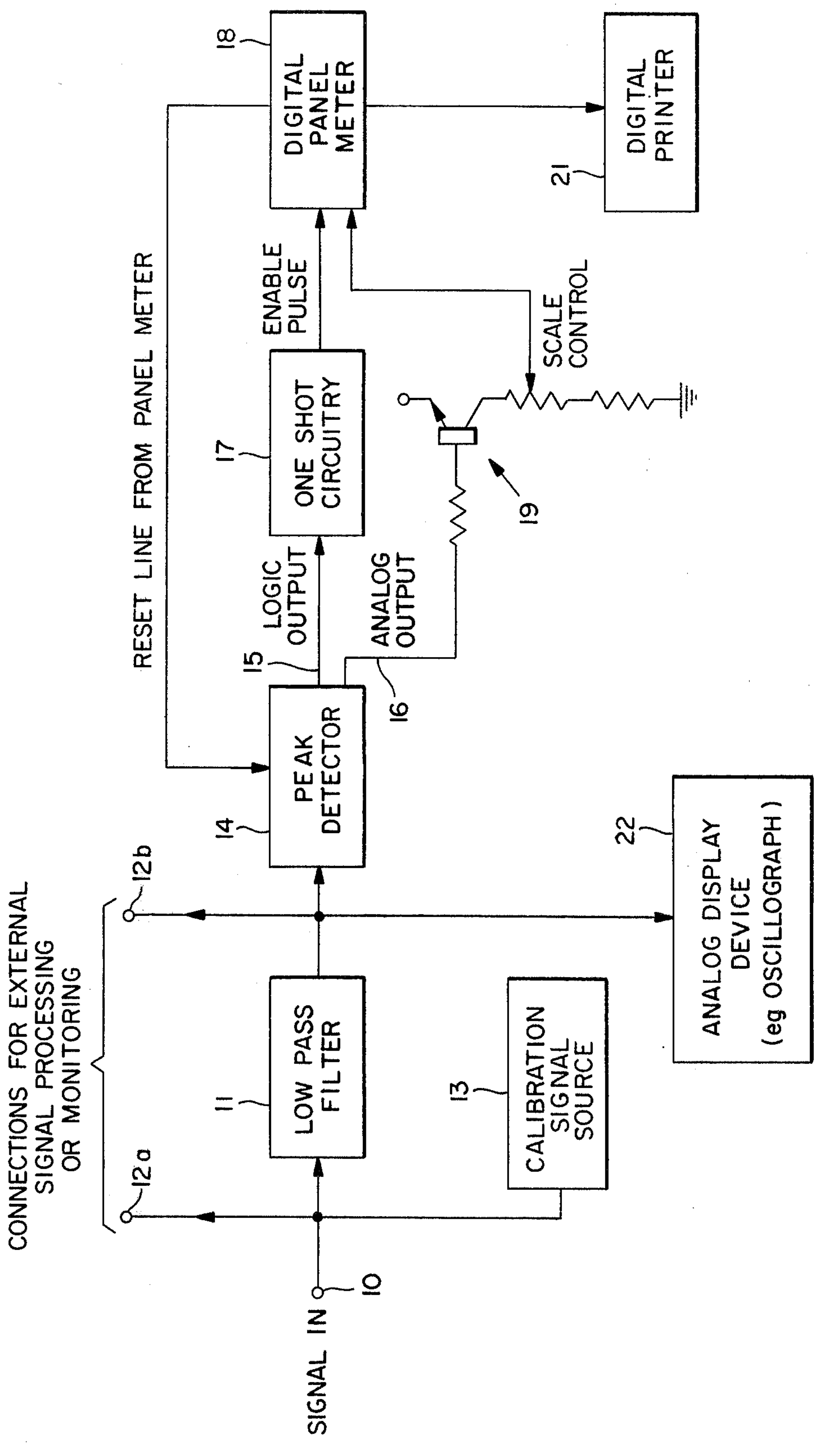
FIG. 4 is a block diagram of the electronic signal processing and recording arrangement operating on the voltage signal developed from the force transducer.
Figure 5:
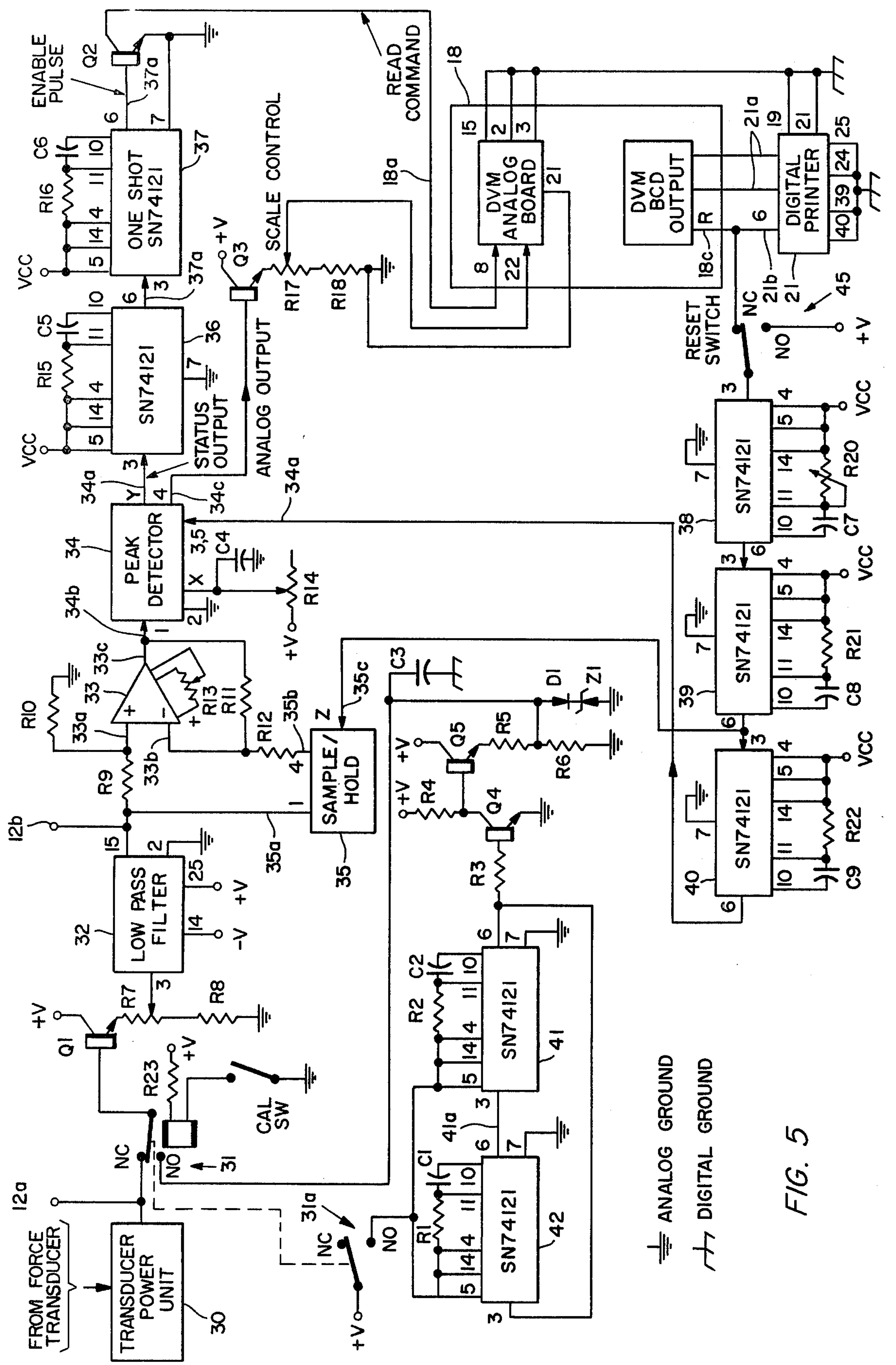
FIG. 5 is a schematic diagram of the arrangement depicted in block form in FIG. 4.

Turning attention to FIG. 5, there is illustrated therein a more detailed schematic diagram of the signal processing circuitry illustrated in block form in FIG. 4. Transducer power unit 30, which is a unit commercially supplied with the transducer, supplies a constant current to the piezo-electric force transducer 1 mounted on the press. The nominal supply voltage (the bias voltage) from this unit may be for example 10 volts. The maximum voltage under full design load would be then approximately 20 volts. The signal voltage from the force transducer is fed through a normally closed electromagnetic switch arrangement 31 to an emitter-follower stage Q1. The signal voltage is reduced by emitter-follower stage Q1, which incorporates a potentiometer arrangement, i.e. gain control, on the output side, so that it may then be processed by subsequent units that have a maximum input voltage of say 10 volts.

Switch arrangement 31 provides a means for connection of the calibration voltage signal source to the input circuitry in lieu of connecting the force transducer output voltage signal to the input circuitry. The calibration relay switch arrangement 31 also provides, upon activation, power to the calibration voltage signal source circuitry via contacts **31*a***.

The output of stage Q1 is coupled to the low pass (0–50Hz) filter 32, which attenuates the high frequency components of the signal. The output of filter 32 is in turn coupled to peak detector unit 34, which may be a commercially available unit such as a Burr Brown Model 4084/25, via amplifier stage 33. Attenuation of the higher frequency components from the signal assists the peak detector unit 34 in avoiding a sensing of a false peak caused for example by interference or noise, not representative of a true force level sensed on the press. However, because there may be found in the force/-voltage waveform signal peaks of sufficient magnitude and appropriate frequency to pass filter 11, additional means for eliminating false maximum peaks are included herein. It should be noted that because of the action of filter 11 and the subsequent circuitry, all signals which might be used for detailed quantitative analysis would have to be obtained prior to the low pass filter output, i.e. at point **12*a***.

Operational amplifier 33 is employed to enable the removal of the bias voltage from the input signal and to amplify any net difference. In this regard, a reference signal is obtained from conventional sample/hold module 35. This reference voltage is sensed sometime after tablet ejection, for example, so that it will correspond to a time when there is no load on the press punch being monitored. The time delay between a panel meter print command output (at **18*c*) and the reference voltage sample command is controlled by the value of the external resistor (potentiometer) R20. The complete reference voltage timing is shown in FIG. 6**. This will be described in detail hereinafter.

The output from amplifier 33 represents the input to the peak detector 34. When the input signal rises above a preset threshold value (i.e. as set by R14), the peak detector 34 is set and, when the first peak is sensed, the status output voltage at **34*a* rises. After, for example, a 0.25 second delay controlled by a monostable circuit element 36, a read command is sent to the digital panel meter 18 through one shot circuit 37 and the transmitter stage Q2**.

The scale control circuit Q3, through scale control R17, is used to control the panel meter and printer output reading in a manner described in detail hereinafter.

A self-contained signal source for calibration use is provided by circuits 41, 42 and their associated components. The output from this system is a square wave with a value of approximately 5 volts. The calibration source may be used as a check on the scale control setting and the system, which obviates on the need for an external voltage monitor.

OPERATION

Regarding the circuitry of FIG. 5 in conjunction with the waveform diagrams of FIGS. 6A–6H, the output of low pass filter 32 is treated by operational amplifier stage 33 to provide a means of establishing a zero reference point input to the peak detector 34, i.e. a voltage that corresponds to zero force on the press punch, so that stage 34 will indeed be able to detect voltage peaks above a voltage that corresponds to zero force. There is, as aforesaid, approximately 10 volts bias in the example embodiment of system herein disclosed. In the arrangement according to the invention this bias voltage is eliminated prior to the introduction of a compression force voltage waveform signal to the peak detector input **34*b* by processing this signal in operational amplifier stage 33. This is accomplished by using in conjunction with amplifier stage 33 the sample/hold circuit 35**, which is a commercially available sample/hold circuit, such as the Burr Brown unit, Model BB4034/25.

Figures 6A, 6B, 6C, 6D, 6E, 6F, 6G, 6H:
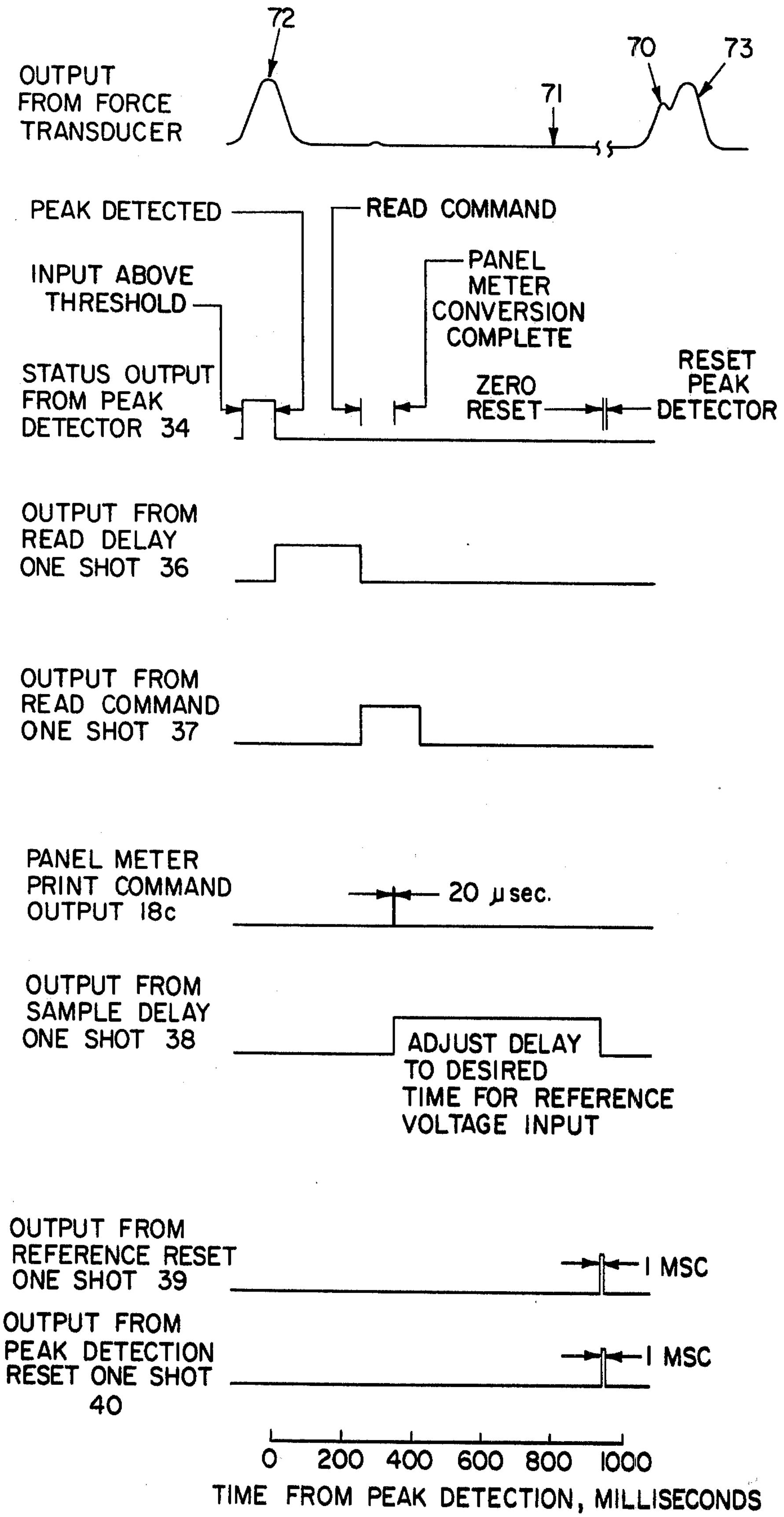
FIGS. 6A through 6H represent a timing diagram illustrating various functions occurring in the circuitry of FIG. 5.

In FIG. 6A, there is illustrated the voltage signal applied to the input **33*a* of amplifier stage 33, with the voltage at for example point 71 of this waveform corresponding to zero force being experienced on the press punch being monitored. Whatever that voltage actually is, it is desired to repesent that voltage to peak detector 34 as zero force on the punch. This is accomplished by forcing that voltage to be represented as zero volts to the detector stage input 34*b***.

The sample/hold stage 35 samples the input voltage at **33*a* via lead 35*a* at a time when the force on the press punch (such as is represented in FIG. 6A at point 71) is essentially zero. This sample voltage occurs in a somewhat arbitrary place in the voltage waveform between punch strokes (i.e. between the actual maximum compression peaks as represented in FIG. 6A at 72 and 73**). The timing at which this sampling occurs will be explained in greater detail hereinafter.

Once sampled, the voltage at lead **35*a* is held on output line 35*b* of sample/hold arrangement 35. The output from lead 35*b* is fed to another input 33*b* of operational amplifier 33. Amplifier stage 33** is a commercially available unit, such as the Burr Brown 3308 unit.

The circuitry of amplifier 33 operates to provide an output at **33*c* of zero whenever the two inputs at 33*a* and 33*b* are substantially the same. In effect, the amplifier output at 33*c* is caused to be zero when the input voltage at 33*a* is essentially the same as the voltage sampled by the sample/hold unit 35 as presented at 33*b***.

Amplifier stage 33 in combination with sample/hold unit 35, then, provides a means for restandardizing the electronics each time a new tabletting cycle occurs and as to which a new zero reference is established in each instance. In this way, compensation for long term drifts which might occur in the upstream circuitry is made. Via the invention one would not have to worry about shifting baselines in the voltage waveform derived from the upstream circuitry.

The sample voltage being held at output **35*b* of the sample/hold unit 35 is maintained until a logic input signal is received by unit 35 at its input 35*c*. That is, the voltage maintained at output 35*b* cannot change until the logic input 35*c* goes high, i.e. a logic high pulse is received. (see in this regard FIG. 6G). When input 35*c* is allowed to go high, the unit 35, as indicated, samples the input voltage at 35*a* and holds that voltage at output 35*b* until the next logic input pulse is received at 35*c***.

Operational amplifier 33 is designed to in effect subtract the two inputs **33*a* and 33*b* and to present the difference at output 33*c*. Since the 35*b* output of sample/hold unit 35 is approximately equal to 33*a* input when sampling by unit 35 occurs, there will be approximately zero volts appearing at the output 33*c* of the operational amplifier stage immediately after the narrow pulse logic signal appearing at 35*c*** of the sample/-hold unit goes low again.

When the voltage at **33*a* input to amplifier 33 begins to rise as a result of compression force being sensed by the transducer 1, the voltage at 33*b*, of course, remains held at the sampled voltage level, and a net voltage output at 33*c* is experienced, referenced now, however, to zero force on the punch press. The net difference in voltage will continue to appear at output 33*c* and until the next logic pulse is received by sample/hold unit 35**.

The net voltage is fed to the peak detector stage 34 via input **34*b*. As soon as the voltage appearing at input 34*b* reaches a preset threshold level, which is set by R14, the status output 34*a* from detector 34 will go from a low to a high condition. When a high output appears at 34*a*, the unit 34 is in a peak detection mode; that is, peak detector 34 is sensing the input voltage signal for a peak, and the analog output 34*c* of detector stage 34 is varying in accordance with the input voltage at 34*b*. The output voltage presented at 34*c*, at any particular time in a tabletting cycle when a high condition exists at 34*b*, will be the highest voltage that has been presented to detector stage 34** up to that time in that cycle.

The purpose of status output **34*a* is to inform the circuitry therefollowing when a peak has been detected. The detected peak may not be the maximum developed compression force peak, however. It may be a false compression force peak which somehow passed the filter 32. In this regard see point 70 on the voltage waveform illustrated in FIG. 6A**.

When the status output **34*a*** drops from a high to a low position, it is determined that a peak has been detected, and indeed, one knows that that peak was above the threshold voltage level established in the peak detecting stage.

In order to make sure that only the maximum developed compression force peak is detected (obtained) and processed during a tabletting cycle, the peak detector 34 is forced to keep looking for additional higher peaks for a certain time after the first peak is sensed. This is accomplished via the one shot stages 36 and 37. When the status output **34*a* again goes low following the detection of a first peak, this results in the activation of one shot stage 36. Stage 36 then provides a logic high output pulse lasting for approximately 200 ms; it is intended as a time delay device. With the occurrence of the high-to-low transition in the output 36*a* of one shot stage 36, one shot 37 is fired. During this 200 ms time delay detector stage 34** continues to look for higher peaks beyond the first peak detected in a tabletting cycle.

This "delay" period coincides with the known time span of maximum duration of the compression force portion of a tabletting cycle for the particular press employed and in use at a particular speed. The maximum speed of the press is the key factor in determining the period of the output pulse of stage 36. It should be noted that this period may be varied, from press operation to press operation, by varying the circuitry associated with stage 36 and, in particular, R15 and C5, which typically (though not particularly shown) could be variable components. The status output 34*a* is illustrated in FIG. 6B, and the output of stage 36 is illustrated in FIG. 6C.

As a result of the high-to-low transition of the output of stage 36, one shot 37 generates an "enable" pulse at 37*a* as indicated in FIG. 6D, which output pulse is processed by driving stage Q2 to develop a read command output 18*a*. It is this logic input to panel meter 18 which commands the panel meter to sample the analog voltage available from detector 34 at its input 18*b* at the time the read command occurs, and to digitalize it. As aforesaid, this analog voltage available from detector 34, is passed through the scaling control circuit Q3, so that the operator can cause the digital output(s) to read any desired number for calibration purposes.

Because of the 200 ms delay provided by one shot 36, the input 18*b* presents to the panel meter 18 only the actual maximum compression force peak detected by peak detector 34 in the compression force portion of a tabletting cycle. Thus, at the sampling time for the input 18*b*, only the highest peak detected will be read.

When the panel meter 18 has finished processing the input at 18*b* and digitalized same, it is then capable of providing this data to a digital printer as well as displaying the same digitally. Included in panel meter 18 is circuitry to effect a short duration pulse which appears at the output 18*c* (shown in FIG. 6E).

This logic output at 18*c* is fed to the printer 21, which represents the command to the printer to print whatever appears on lines 21*a* from the panel meter 18. Printer 21 conventionally contains circuitry to accept the command at line 21*b*, and to read the BCD input at line 21*a*, with the printer then printing what is read at inputs 21*a* at the time the print command is received at 21*b*.

At the same time, the output pulse at 18*c* is fed also through a normally closed reset switch 45 to a monostable multivibrator (one shot) circuit 38. The purpose of one shot 38 is to provide a delay from the time that a print command is given to the next time that a reference level should be established as input to the peak detector 34. The time at which the logic print command pulse appears at 18*c* is rather close to the time of a peak detection (about 200 ms after the first peak is detected in a tabletting cycle).

Some means is required after the time the highest peak is detected to tell the sample/hold module 35 to once again sample the input voltage appearing at 35*a* and to hold same for development of a reference voltage for the subsequent tabletting cycle. One shot 38, therefore, provides means to effect this sequence. In FIG. 6F, which represents the output of one shot 38, there is included with this waveform a note that the delay time, i.e. the output pulse of stage 38, is to be adjusted so that the trailing edge thereof coincides with the desired time for the next sampling by the sample/hold module, which would be at a true zero punch force portion of the tabletting cycle illustrated in FIG. 6A, such as the zero force point indicated at 71. The time interval provided by stage 38 is adjustable via potentiometer R20, and typically could be in the neigborhood of 600 ms. If a different press operating at say twice the speed were used, this time delay provided by one shot 38 could be reduced accordingly by appropriate adjustment of R20.

The output of one shot 38 is fed through a second monostable multivibrator stage 39. Stage 39 provides a very short duration pulse (see FIG. 6G) upon the occurence of the high-to-low transition of the pulse output from stage 38. The output pulse from one shot 39, in turn, is coupled on the one hand directly to the sample/hold stage 35 as the logic input thereto at 35*c*. As a result, there is, as aforesaid, provided the reference voltage for the next tabletting cycle. At the same time, the logic pulse output at 39 is fed to yet another one shot 40. One shot 40 in turn provides a logic output pulse of very short duration (see FIG. 6H) which is fed to the control circuitry of the peak detector 34 at input 34*d*. This logic pulse received by the detector 34 control circuitry causes the peak detector to reset and to start hunting for a peak in the next tabletting cycle.

Thus, the peak detector 34 is reset about 1 ms after the sample/hold module 35 has provided a new reference voltage to the peak detector. Following the reset of the peak detector 34, the status output at 34*a* is in a low condition and remains so for a time. A status output will appear again at 34*a* only when the input to peak detector 34 at 34*b* exceeds the threshold value as set by R14.

The reset switch 45 provides for the situation when one first turns on the apparatus and when one wants the very first reading to be truly representative of the first actual maximum developed compression force peak that is detected by transducer 1. In order to do so, it is necessary to establish the reference voltage supplied by the sample/hold stage 35 to amplifier 33. This is normally done, as aforesaid, some fixed time duration after the previous compression force peak was sensed and recorded. However, when first turning on the apparatus there is no previous compression peak. The reset switch 45, therefore, provides a logic high to unit 38 which activates the circuitry that eventually causes sample/hold unit 35 to sample the input voltage at 35*a*, existing at that time. The sample would constitute the bias voltage of the system only. Thus as a starting point one achieves via the reset switch 45 a zero voltage reference signal being fed to the detector 34. Otherwise, the first reading corresponding to the first maximum developed compression force detected may not be accurate. Even without the reset provision, however, all other detected maximum peaks would result in accurate readings.

Reference was made hereinbefore to the internal calibration facility, and to the fact that scaling may be accomplished in the invention described herein without additional instrumentation using the self-contained calibration signal source. The calibration signal supplied to the electronic processing circuitry by the calibration signal source via the calibration switch 31, is generated by a pair of one shots 41 and 42 coupled together in head-to-tail fashion. When one fires, say unit 41, it will remain in the logic high stage for a set period of time established by the values of R2 and C2. During the high/low transition of the output of one shot 41 at 41*a*, the one shot unit 42 in turn is activated and remains in a logic high state for a similar period, and via its high/low transition will once again activate one shot 41, and so on. This sequence is begun with the application of voltage to stages 41 and 42 via contacts 31*a* of switch 31, with, however, some initial momentary instability upon application of the voltage to stages 41 and 42.

Transistor stage Q4 amplifies the signal output of the head-to-tail coupled one shots 41 and 42 to drive emitter-follower stage Q5, which in turn has in its emitter leg a zener diode Z1 to clamp the voltage at the desired reference or calibrate voltage (in the sample given herein the Z1 voltage is 5.03 volts).

The calibration circuit, then provides an essentially square wave type signal to the processing electronics to simulate the periodic press punch compression force signals. The square wave pulses are of the same magnitude in each instance, and the period of the calibration signal output is approximately 1 second with the pulse duration provided by one shots 41 and 42 being approximately 200 ms.

It should be noted that the pulse duration provided by, one shots 41 and 42 may be varied by varying the value of the components R2, C2 and R1, C1 respectively. Moreover, the pulses produced by one shots 41 and 42 are intentionally rounded off so as to simulate closely enough the shape of the input from the force transducer 1 on a typical running press. By the calibration circuitry, one can by actuating the calibration circuit switch 31, send a calibration pulse approximately every second through this system so that one may observe the results of these pulses both at the digital printer output and on the digital panel meter display. Therefrom, one may determine whether or not the gain etc. throughout the system is properly set and the processing electronics are in proper working order. Thus, an operator on say the following shift merely has to actuate the calibration switch and see the digital readout to know whether or not the electronic processing equipment is functioning properly.

In further regard to the scale control R17 and the scale control circuit Q3 (in conjunction with the provision of the internal calibration circuitry), the voltage level input being supplied by the calibration circuitry via switch 31 would be known. The voltage level corresponding to a certain force on the force transducer, determinable from the transducer manufacturer's sensitivity rating, would also be known. Thus, since the calibration system is supplying a known voltage, it is easily calculated how many kilograms should be registered in the output reading displayed by the panel meter 18 and the printer 21. In regard thereto, an example of scaling is indicated below.

Scaling Data (a) Force transducer sensitivity (supplied by manufacturer of force transducer): 0.485 mv/kg (0.220 mv/lb).

(2) Internal calibration voltage: 5.03 volts.

(c) Calibration reading required to have panel meter and printer registering kilograms with a 5.03 volt calibration signal: 5.03 volts/0.000485 volts per kilogram = a 10,370 (± 200) kilogram reading.

Thus, with the established calibration voltage (5.03v) being intended to cause a reading of for example 10370 ± 200 when the system is scaled to read in kilograms, the operator merely throws the calibration switch and observes this reading on the output to know that the processing electronics are operating correctly.

For extremely accurate calibration, the operator may input at 12*a* a precise signal to effect a particular reading to enable the system to be optimally adjusted. The scale control is at the outset adjusted to read in the units desired. By the scale control R17, there is provided enough adjustable latitude to derive the output as desired, for example in pounds instead of kilograms.

By the invention there has been demonstrated that a non-destructive continuously monitorable means now exists to closely control the hardness of a formulation in tabletted form on a large production scale. The instrumented method of the invention provides the assurance that each formed tablet of a particular formulation can be prepared on a production scale and meet the rate of release pattern desired for that formulation.

While the principles of this invention have been described herein in connection with specific apparatus, it is to be understood that this description is made only by way of example and not as a limitation on the scope of the invention as set forth in the objects and features thereof and/or in the accompanying claims.

I claim:

1. A method for establishing, within pre-established limits of a desired value, tablet-to-tablet and batch-to-batch consistency of a particular physio-chemical parameter of a tabletted formulation, said parameter being release rate of drug substance relative to desired biological response and having a dependency on tablet hardness, said formulation being particulate material intended to be compacted into tablets on a suitable tablet press, comprising:

(a) preliminarily compressing on the tablet press from a first batch of said formulation at least one tablet of the formulation at each of a plurality of different selected tabletting compression forces and obtaining from the tabletting events of said at least one tablets respective electrical signals representative of tablet formation force information and including maximum compression force information;

(b) isolating from said tablet formation force information the maximum compression force information associated to each preliminarily compressed tablet;

(c) analyzing at least one tablet preliminarily compressed at each of the selected compression forces to derive the respective values of the physio-chemical parameter thereof and relating said values of the parameter respectively to the corresponding maximum compression force of those tablets analyzed;

(d) selecting from said values of the physio-chemical parameter a value within said pre-established limits which approximates the desired value of said parameter;

(e) setting the tablet press at that compression force setting which corresponds to the selected value of said physio-chemical parameter and compressing the remainder of the first batch of the formulation at that setting of the tablet press; and (f) performing (a) – (e) for a second batch of the formulation, the maximum compression force setting of the tablet press selected thereby for said second batch which corresponds to said parameter of the tablets compacted from the second batch being within said pre-established limits and approximating that of the tablets compacted from the first batch.

* * * * *